Figures 1, 2:
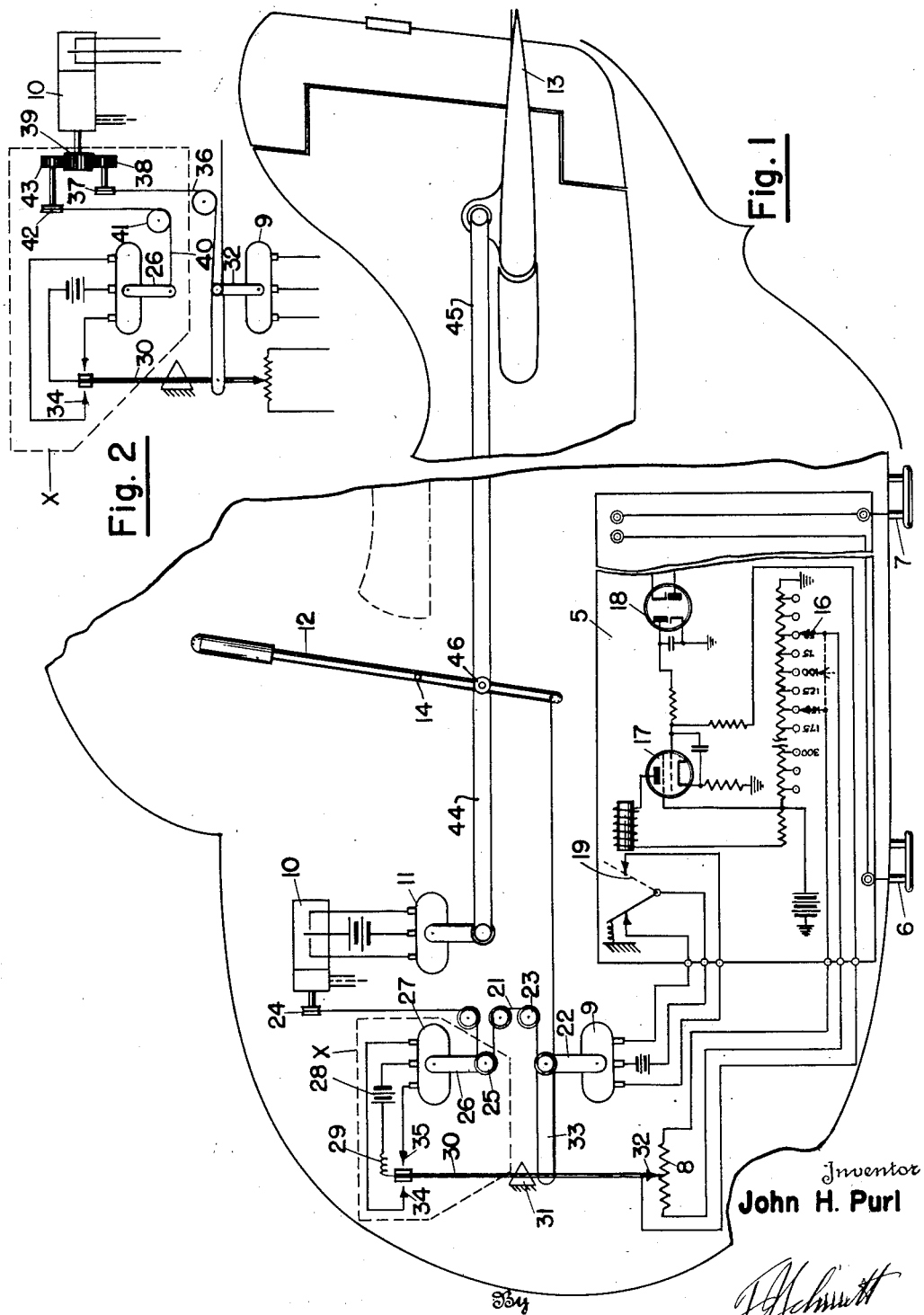

Sept. 4, 1951    J. H. PURL    2,566,368
RADIO ALTIMETER TRIMMER
Filed Oct. 11, 1946

Inventor
John H. Purl

Patented Sept. 4, 1951

2,566,368

UNITED STATES PATENT OFFICE 2,566,368

RADIO ALTIMETER TRIMMER

John H. Purl, United States Navy

Application October 11, 1946, Serial No. 702,568

8 Claims. (Cl. 244—77)

(Granted under the act of March 3, 1883, as amended April 30, 1928; 370 O. G. 757)

This invention relates to a tie-in device for the radio altimeter to compensate for changes in trim of an aircraft.

In the usual automatic altitude control means, the radio altimeter output is connected to a motor whose movement causes a change in pitch attitude of the airplane through the automatic pilot thereby affecting a change of altitude in accordance with the signal from the radio altimeter. The follow-up potentiometer also driven by this motor prevents excessive changes of altitude, limiting the changes of attitude in proportion with the amount of altitude change desired. The basic calibration of the control altitude settings on the radio altimeter are made with the potentiometer in center position. The radio altimeter control is normally engaged at this position of the potentiometer control. After the radio altimeter control is engaged, any maneuver banking, turns, or shift of trim of the airplane due to gas consumption, bomb drop, etc. necessitating a change of the elevator control surface to maintain level flight will cause a shift of the operating point of the potentiometer and thusly a change in the set altitude of the radio altimeter control will result.

The proposed invention, hereinafter to be referred to as a radio altimeter trimmer, will correct for this change or error.

Thus it is a primary object of this invention to provide a device working in conjunction with a radio altimeter and automatic pilot to assist in controlling an aircraft in altitude.

A further object of this invention is to provide a means for eliminating the errors created in a radio altimeter automatic pilot system due to changes of trim of an aircraft.

Other objects and advantages of this invention will become apparent from the following description.

Figure 1 is a circuit diagram of an automatic altitude control system embodying my invention shown within dotted lines, and Figure 2 is a modified portion of Fig. 1 taken within the broken line enclosure x.

Shown by Figure 1 is a conventional radio altimeter automatic pilot system including a conventional radio altimeter 5, sending and receiving antennas 6 and 7, follow-up potentiometer 8, gyro trim motor 9, gyroscope 10, servomotor 11, stick 12, and elevators 13. Stick 12 may be pivoted at 14 and is operatively connected at 46 to servomotor 11 by link 44, and to elevators 13 by link 45.

These elements operate in the conventional manner wherein the altitude selector switch 16 after being set at the desired altitude adjusts the grid bias of the altitude limit indicator amplifier 17 of the radio altimeter 5. Heterodyne signals resulting from the mixing of transmitted and received frequency-modulated radio waves are introduced to the grid of the altitude limit indicator amplifier 17 through the altitude limit counter tube 18. Plate current will now flow in the altitude limit indicator amplifier 17 at a rate dependent upon the frequency of the heterodyned signals which in turn depend upon the altitude at which the craft is flying. The relay 19 in the plate circuit is energized accordingly and a signal is sent from one or the other of the two relay contacts of relay 19 to the gyro trim motor 9 to control clockwise or counterclockwise rotation thereof.

A cable 21, connected to stick 12 passed around a pulley on arm 22 follows over a pulley 23 and, in the conventional system, is connected directly to the pulley 24 of the gyroscope 10, and thus changes the stabilization axis of the gyroscope 10 in response to the rotation of the arm 22 of gyro trim motor 9. The contact arm of the follow-up potentiometer is also moved as a result of the rotation of arm 22 thereby changing the grid bias of the altitude limit indicator amplifier 17 in the proper direction to rebalance relay 19, hence the motion of the gyro trim motor 9 is directly proportional to the initial unbalance of the circuit or the distance from set altitude.

In my invention the cable 21 is run over a pulley 25 journalled on lever arm 26 which is mounted rotatively rigid with servomotor 27. Servomotor 27 is constructed to operate in clockwise and counterclockwise rotation, and is energized by battery 28 pigtail 29 connected to double throw armature 30 pivoted at 31 and having a slider 32 on the other end engaged with follow-up potentiometer 8. Trim motor 9 actuates said armature thru link 33 pivotally connected to said armature and arm 22 of trim motor 9. Contacts 34 and 35, connected to motor 27, are associated with armature 30 to control clockwise or counterclockwise rotation thereof.

In the conventional system, as explained above, a shift of trim of the airplane due to gas consumption, bomb drop, etc., necessitating a change of the elevator control surface to maintain level flight will cause a shift in the operating point of the potentiometer and thus a change in the set altitude of the radio altimeter control will result.

To correct this altitude error, my invention provides means for re-centering the potentiometer to the originally set altitude in the following manner. As the stabilization axis of the gyroscope 10 is changed responsive to the rotation of arm 22 of trim motor 9, armature 30 is also moved thru its link 33 connection with said arm. The movement of armature 30 actuates the follow-up potentiometer in a manner to reduce the amount of applied control and also closes contact 34 which produces a rotation of motor 27 which applies a control to compensate for the change of trim. In this way motors 9 and 27 coact in a manner to communicate a differential motion to said gyroscope thru the follow-up means. Thus a shift has been made in the stabilization axis by the motor 9 to compensate for change of altitude, and a permanent shift has been made in the stabilization axis by motor 27 to compensate for the change of trim.

The mechanism and its ratios are so arranged that the correct amount of control will be applied and removed at the proper rate as the airplane returns to its normal altitude of flight.

Figure 2 is a fragmentary diagram showing a modified form of my invention adapted to be tied-in the same altitude control system as above. The dotted lines enclose the improvement per se therein, and connections to the system are shown therearound. In this embodiment the armature 30 is structurally and functionally the same as in Figure 1. However, the cable 36 follows around a pulley on arm 32 to a pulley 37 rotatively rigid with gear 38. Gear 38 meshes with gear 39 fixed directly to gyro 10 pickoff. A cable 40 secured to the end of arm 26 runs around pulley 41 and thence to pulley 42 secured rotatively rigid with a gear 43. Gear 43 engages gear 39 and coacts with gear 39 and coacts with gear 38 to communicate a differential motion to gear 39. When armature 30 closes contact 34, a control is applied which compensates for the change of trim; whereas, when arm 32 moves responsive to a signal from the altimeter the stabilization axis of gyro 10 is changed. Thus a shift has been made in the stabilization axis by motor 9 to compensate for change of altitude, and a permanent shift has been made in the stabilization axis by motor 27 to compensate for change of trim.

While a particular embodiment of this invention has been illustrated and described herein, it is not intended that this invention be limited to such disclosure, and changes and modifications may be made and incorporated within the scope of the claims.

The invention described herein may be manufactured and used by or for the Government of the United States of America for governmental purposes without the payment of any royalties thereon or therefor.

What is claimed to be:

1. In automatic control apparatus of the character disclosed for use aboard an aircraft having a control stick and an altitude control surface operatively connected to said stick and controlled therefrom, in combination, automatic pilot means including gyroscope means, reversible motor means having the operation thereof controlled from said gyroscope means, said motor means being operatively connected to said stick for adjusting the position thereof and adjusting the position of said control surface, cable means interconnecting said stick and gyroscope means for controlling the operation of said gyroscope means in accordance with the position of said stick, radio altimeter means including a follow-up potentiometer having a slider and a reversible trim motor operatively connected to the slider of said potentiometer for controlling the setting thereof, said reversible motor and slider being operatively connected to said cable means, said slider having an armature connected thereto, an electrical contact carried by said armature, servomotor means including an additional reversible motor operatively connected to said cable means for increasing and decreasing the lenth of the path of travel of the cable means selectively in accordance with the direction of rotation of the additional reversible motor, and circuit means including said armature contact, a pair of contacts disposed adjacent thereto, and a source of potential connected to said additional reversible motor for controlling the operation of said additional reversible motor in accordance with the direction of movement of said potentiometer slider.

2. In apparatus of the character disclosed for use with an aircraft altitude control system of the type in which an automatic pilot having a reversible motor for controlling the position of the control stick is employed, with a gyroscope for controlling the operation of the reversible motor and having a cable connecting the stick and gyroscope, and in which radio altimeter means is employed for controlling the altitude of the aircraft, said radio altimeter means including an additional reversible trim motor and a follow-up potentiometer having a slider controlled thereby, said additional reversible motor being operatively connected to said cable, apparatus for automatically adjusting the length of the path of travel of said cable thereby to recenter the potentiometer slider, said apparatus comprising, in combination, an armature connected to the slider of said potentiometer to be moved therewith and having an electrical contact carried thereby, servomotor means including a third reversible motor operatively connected to said cable for increasing and decreasing the length of the path of travel thereof selectively in accordance with the direction of rotation of said third reversible motor, and circuit means interconnecting said third reversible motor and contact for controlling the operation of said third reversible motor in accordance with movement of said potentiometer slider.

3. In apparatus of the character disclosed for use with an aircraft altitude control system of the type in which an automatic pilot having a reversible motor for controlling the position of the control stick is employed, with a gyroscope for controlling the operation of the reversible motor and having a cable connected to the stick and gyroscope, and in which radio altimeter means is employed for controlling the altitude of the aircraft, said radio altimeter means including an additional reversible trim motor and a follow-up potentiometer having a slider controlled thereby, said additional reversible trim motor being operatively connected to said cable, apparatus for automatically adjusting the length of the path of travel of said cable thereby to recenter said potentiometer slider, said apparatus comprising, in combination, an armature connected to the slider of said potentiometer to be moved therewith and having an electrical contact carried thereby, servomotor means including a third reversible motor, a pulley operatively connected to said cable and to said third reversible motor and having its position controlled thereby, a pair of contacts associated with said armature contact, and circuit means including a source of potential interconnecting said contacts and third reversible motor for controlling the operation of said third reversible motor in accordance with movement of said potentiometer slider.

4. Control apparatus of the character disclosed for use aboard aircraft comprising, in combination, automatic pilot means including a control stick with gyroscope means and motor means for controlling said stick and having a cable interconnecting said stick and gyroscope means for readjusting said gyroscope means to normal condition upon completion of a control operation wherein the normal attitude of the aircraft in substantially level flight is temporarily altered to provide for changes in altitude, radio altimeter means, said radio altimeter means including additional reversible motor means operatively connected to said cable for controlling the altitude of the aircraft through the medium of said gyroscope means, and third reversible motor means operatively connected to said cable for controlling the length of path of travel thereof thereby to correct for errors resulting from the interaction of the automatic pilot means and radio altimeter means.

5. In apparatus of the character disclosed for use with an aircraft altitude control system of the type in which an automatic pilot having a reversible motor for controlling the position of the control stick is employed, with a gyroscope for controlling the operation of the reversible motor and having a cable connecting the stick and gyroscope, and in which radio altimeter means is employed for controlling the altitude of the aircraft, said radio altimeter means including a reversible trim motor and a follow-up potentiometer having a slider controlled thereby, said trim motor being operatively connected to said cable, apparatus for automatically adjusting the length of the path of travel of said cable to correct the setting of the slider of said potentiometer for errors resulting from the interaction of said stick and trim motor through said cable, said apparatus comprising, in combination, a pivoted armature connected to the slider of said potentiometer to be moved therewith and having an electrical contact carried thereby, servomotor means including a third reversible motor, a lever arm mounted rigid with the output shaft of said third reversible motor, a pulley journalled for rotation on said lever arm, said cable running on said pulley, a pair of contacts associated with said armature contact, and circuit means including a source of potential interconnecting all said contacts and third reversible motor for controlling the operation of said third reversible motor in accordance with movement of said potentiometer slider.

6. In apparatus of the character disclosed for use in aircraft having a control stick and an altitude control surface controlled thereby, in combination; automatic pilot means including gyroscope means having normally open electrical contacts, reversible motor means including a source of potential and controlled from said electrical contacts, said reversible motor means being operatively connected to said stick and control surface, and cable means interconnecting said stick and gyroscope means, said gyroscope means, reversible motor means, and cable means providing an arrangement whereby, upon the departure of the aircraft from level flight said contacts are closed in a manner to energize the reversible motor means to move the control surface to restore the aircraft to level flight, and the cable means thereafter restores the contacts to their normally open condition; altimeter means including a reversible trim motor having an output shaft, an arm secured to said shaft to rotate therewith, a pulley journalled upon said arm and having said cable means cooperating therewith, a link pivotally connected to said arm, a pivoted armature pivotally connected to said link, and a follow-up potentiometer having a movable slider, said slider being carried at one end of said pivoted armature, said altimeter means being constructed and arranged, through movement of said cable means, to maintain the aircraft at a substantially constant predetermined absolute altitude; and apparatus for re-centering the slider of said potentiometer after readjustment of the altitude of the aircraft, said apparatus comprising an additional electrical contact carried by the other end of said pivoted armature, other contacts associated with said additional electrical contact, a reversible servomotor having an output shaft, an additional arm secured to said last named shaft for rotation therewith, an additional pulley journalled on said additional arm, said additional pulley cooperating with said cable means to increase and decrease the length of the path of travel thereof selectively in accordance with the direction of rotation of said reversible servomotor, and circuit means including a source of potential operatively connecting said reversible servomotor to said additional and other contacts to energize said reversible servomotor to rotate in two directions selectively in accordance with the direction of movement of said potentiometer slider from its center position.

7. In apparatus of the character disclosed for use in aircraft having a control stick and an altitude control surface controlled thereby, in combination; automatic pilot means including gyroscope means having normally open movable electrical contacts, reversible motor means including a source of potential and controlled from said electrical contacts, said reversible motor means being operatively connected to said stick and control surface, a shaft-gear mechanism including a first shaft having a first gear mounted thereon to rotate therewith and controlling the position of at least some of said contacts in accordance with the setting thereof, a second shaft having a second gear secured thereto to rotate therewith, said second gear meshing with said first gear, a first pulley secured to said second shaft to rotate therewith, a third shaft having a third gear secured thereto to rotate therewith, said third gear meshing with said first gear, a second pulley secured to said third shaft to rotate therewith, and first cable means interconnecting said stick and first pulley, said gyroscope means, reversible motor means, first cable means and shaft-gear mechanism providing an arrangement whereby, upon the departure of the aircraft from level flight said contacts are closed in a manner to energize the reversible motor means to move the control surface to restore the aircraft to level flight, and the first cable means thereafter restores the contacts to their normally open condition; altimeter means including a reversible trim motor having an output shaft, an arm secured to said shaft to rotate therewith, a third pulley journalled upon said arm and having said first cable means cooperating therewith, a link pivotally connected to said arm, a pivoted armature pivotally connected to said link, and a follow-up potentiometer having a movable slider, said slider being carried at one end of said pivbted armature, said altimeter means being constructed and arranged, through movement of said first cable means, to maintain the aircraft at a substantially constant predetermined absolute altitude; and apparatus for recentering the slider of said potentiometer after readjustment of the altitude of the aircraft, said apparatus comprising an additional electrical contact carried by the other end of said pivoted armature, other contacts associated with said additional electrical contact, a reversible servomotor having an output shaft, an additional arm secured to said last named shaft for rotation therewith, a fourth pulley journalled on said additional arm, second cable means cooperating with said first pulley and fourth pulley to increase and decrease the length of the path of travel of said first cable means selectively in accordance with the direction of rotation of said reversible servomotor, and circuit means including a source of potential operatively connecting said reversible servomotor to said additional and other contacts to energize said reversible servomotor to rotate in two directions selectively in accordance with the direction of movement of said potentiometer slider from its center position.

8. In apparatus of the character disclosed for use on aircraft having a stick and altitude control surface operatively connected thereto and controlled therefrom, in combination, automatic pilot means for said control surface having gyroscope means including normally open electrical contacts, said automatic pilot means being of the type in which cable means interconnecting said stick and gyroscope means is employed to readjust the contacts to open position after the automatic pilot has corrected the aircraft for undesired changes in attitude, altimeter means in which a reversible trim motor and follow-up potentiometer having a slider are employed, said altimeter means having the trim motor operatively connected to the slider of said potentiometer and to said cable means for automatically regulating the altitude of the aircraft, and additional servomotor means operatively connected to and controlled by movement of said slider, said additional servomotor means being operatively connected to said cable means for automatically readjusting the length of the path of travel of said cable means whereby to recenter said potentiometer slider upon the completion of a change in the altitude of said aircraft.

JOHN H. PURL.

REFERENCES CITED

The following references are of record in the file of this patent:

UNITED STATES PATENTS

| Number | Name | Date |
|---|---|---|
| 2,225,046 | Hunter | Dec. 17, 1940 |
| 2,358,803 | Hanson et al. | Sept. 26, 1944 |
| 2,415,429 | Kellogg et al. | Feb. 11, 1947 |
| 2,423,336 | Moseley | July 1, 1947 |
| 2,443,748 | Sanders et al. | June 22, 1948 |
| 2,466,534 | Cole | Apr. 5, 1949 |